July 9, 1946.   W. J. MILLER   2,403,820
SPREADER BOX
Filed July 31, 1944

Inventor
William J. Miller,
By
W. B. Harpsman
Attorney

Patented July 9, 1946

2,403,820

UNITED STATES PATENT OFFICE 2,403,820

SPREADER BOX

William J. Miller, Youngstown, Ohio, assignor to The City Asphalt and Paving Company, Youngstown, Ohio, a corporation of Ohio Application July 31, 1944, Serial No. 547,438

5 Claims. (Cl. 94—44)

1

This invention relates to a spreader box and more particularly to a spreader box adapted to uniformly spread asphaltic concrete and other bituminous base paving materials.

The principal object of the invention is the provision of a spreader box designed to be used in combination with a conventional motor truck.

A further object of the invention is the provision of a spreader box attached to a motor truck and operated in connection therewith with respect to the adjustments necessary for varying the thickness of the material being spread and laid.

A still further object of the invention is the provision of a spreader box incorporating a material spreading and compacting means adjustably positioned with respect to the device.

A still further object of the invention is the provision of a means of attaching a spreader box to the supporting motor truck.

The spreader box shown and described herein has been designed to form a relatively inexpensive yet practical spreader box for the application of various so-called "black top" materials widely used in paving and resurfacing operations. It is known that rather cumbersome and complicated mechanisms have heretofore been devised and employed for spreading various road building materials particularly concrete and the like and the present invention contemplates an improvement with respect to such devices in that a relatively simple and inexpensive mechanism has been designed which is capable of being operated in connection with a conventional motor truck which supplies the motive power and serves as a means of supplying the hopper of the spreader box itself with additional material to be spread and at the same time, and most importantly, provides a fixed point of support for a portion of the spreader box making possible its spreading of material of a desirable uniform thickness, particularly with respect to relatively rough road beds or other areas over which the material is being applied. The device is so designed that when used in combination with a conventional motor truck having an attachment bracket affixed to its rear axle, it approximates in use and efficiency the heretofore known complicated and expensive paving machines.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
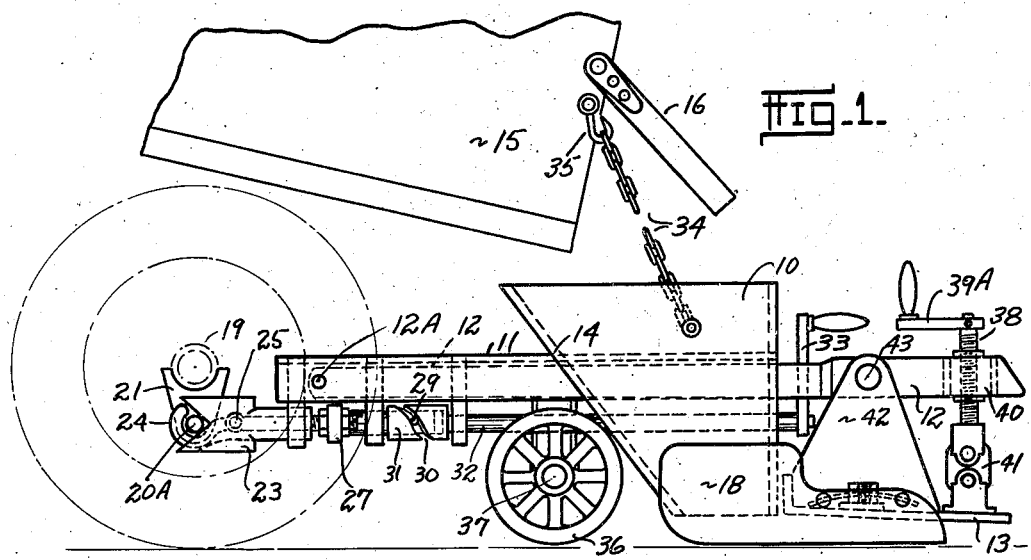
Figure 1 is a side elevation of a spreader box illustrating a portion of a dump truck body and symbolically designating the rear wheels and axle of the dump truck with which the spreader box is used.
Figure 2:
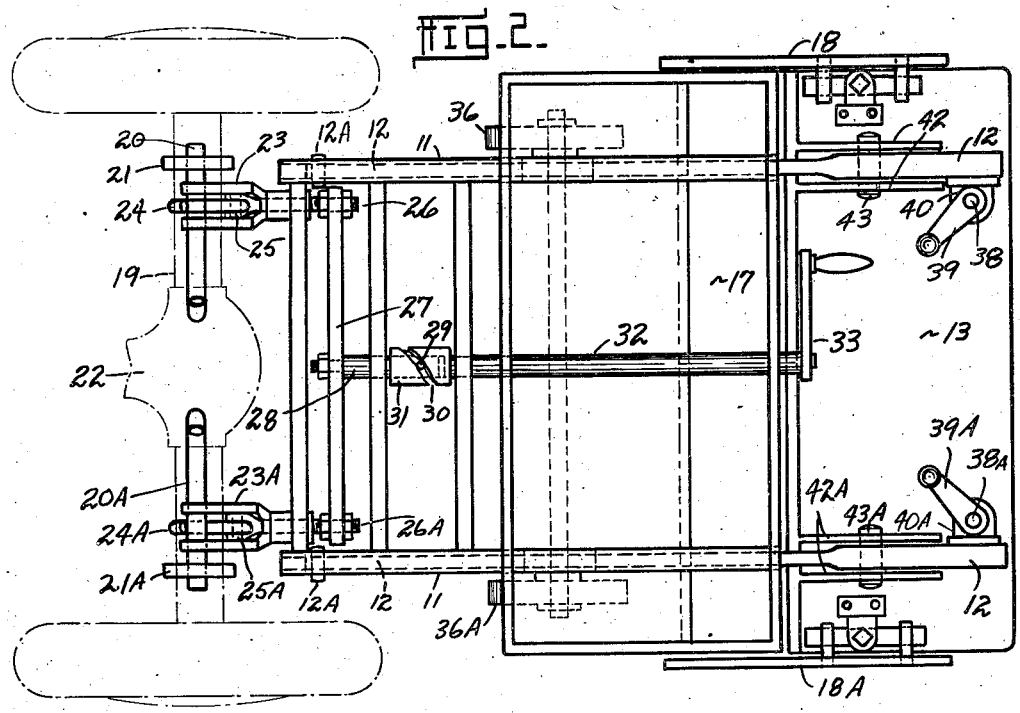
Figure 2 is a top plan view of the device illustrated in Figure 1 and shows the rear axle and wheels of the dump truck in symbolic illustration.

By referring to the drawing and Figure 1 in particular it will be observed that the spreader box consists primarily of a hopper 10 supported on a hollow frame 11. The frame 11 includes a plurality of cross members and extends through the hopper 10 and terminates at the rearmost edge thereof so as to provide for the free positioning in the hollow frame 11 of a pivoted frame 12 to which a material smoothing and compacting screed 13 is attached adjacent the hopper 10. The adjustable frame 12 is pivoted at its forward end (the left end in Figures 1 and 2) in the hollow frame 11 by means of a pivot 12A. The hopper 10 is formed with an inclined front wall 14 and is of a size comparable in width with a conventional dump truck body so that it can receive material from the dump truck body. In Figure 1 a portion of a dump truck body is indicated by the numeral 15 and it will be observed that material released from the dump truck body 15 as by the opening of a tail gate 16 will fall directly into the hopper 10 and be directed downwardly and rearwardly by the inclined front wall 14 of the hopper 10. The bottom of the hopper 10 is open, as indicated by the numeral 17, and the material placed in the hopper 10 flows outwardly therethrough and as the entire spreader box is normally being moved forward or to the left, as illustrated in Figures 1 and 2, the material is evenly spread and smoothed and partially compacted by the screed 13 which is positioned immediately in back of the hopper opening 17. Flexibly mounted, adjustably positioned side guides 18 and 18A, respectively, are carried on the sides of the screed 13 and control the sideward spreading action of the material being spread by the spreader box so as to form sharp straight edges. It will be observed that the dump truck axle is indicated by the numeral 19 and that a pair of mounting rods 20 and 20A are positioned beneath the axle 19 preferably by means of mounting brackets 21 and 21A welded to the axle 19, the innermost ends of the mounting rods 20 and 20A being welded directly to the differential case 22 of the truck axle 19.

The method of attaching the spreader box to the mounting rods 20 and 20A on the truck axle 19 contemplates the necessity of providing a mechanism capable of almost automatic operation so that a loaded truck may be backed into operating connection with the spreader box attachment means and the same secured thereto with relative ease and simplicity. The mounting means comprises a pair of couplers 23 and 23A, the foremost portions of which are formed with a relatively sharp V-like slot of sufficient size to receive the mounting bars 20 and 20A on the truck axle 19. A pair of movable hooks 24 and 24A are mounted one in each of the couplers 23 and 23A for longitudinal movement and are pivoted as at 25 and 25A to operating rods 26 and 26A which extend rearwardly from the couplers 23 and 23A and are affixed to the outermost ends of an operating arm 27 which is supported thereby and adapted to be moved by a centrally positioned rod 28 which is attached thereto and which is provided with a pin 29 operatively located in a spiral groove 30 in a tubular member 31 positioned on the forward end of an operating arm 32 which extends backwardly through the hopper 10 and terminates above the screed 13 and is provided with a handle 33 so that it can be partially revolved thereby so as to impart longitudinal movement to the operating arm 27 and hence to the operating rods 26 and 26A and the coupler hooks 24 and 24A. It will thus be observed that at such time as the device is to be attached to a truck for use, the handle 33 is revolved to cause the coupler hooks 24 and 24A to move forward or to the left as illustrated in Figures 1 and 2 and thereby move, by gravity, downwardly out of the couplers 23 and 23A and thereby permit the couplers 23 and 23A to engage the mounting rods 20 and 20A on the truck axle 19. The handle 33 imparts rotating motion to the tubular member 31 and the spiral slot 30 therein causes the longitudinal travel of the pin 29 and hence the coupler hooks 24 and 24A causing them to move sidewardly or to the right, as illustrated in Figures 1 and 2, and upwardly due to the construction of the bottom portion of the couplers 23 and 23A and thereby engage the mounting bars 20 and 20A as best shown in Figure 1.

If it is desired that the spreader box be moved to a desirable position prior to its employment in the actual spreading operation it may be conveniently moved by the attachment of chains 34 to hooks 35 on the dump truck body 15 when the dump truck body is in slightly elevated relation and its rearmost end, therefore, lowered with respect to its normal untilted position. When the truck body is returned to its normal position the entire spreader box is elevated by the chains 34 and while thus carried by the truck it may be conveniently moved to any location. In operation the chains 34 are unhooked and the hopper and hollow frame 11 of the spreader box are supported by the truck axle 19 and by a pair of wheels 36 and 36A which are positioned on an axle 37 which in turn is attached to the hollow frame 11. A pair of adjustment screws 38 and 38A threadably engage brackets 40 and 40A on the rearmost ends of the pivoted frame 12 and are pivotally connected at their lowermost ends by pivot assemblies 41 to the screed 13. The screed 13 is pivotally supported by pairs of triangular shaped brackets 42 and 42A on the pivoted frame 12 by means of pivots 43 and 43A so that the rearmost portion of the screed 13 may be raised or lowered by the manipulation of the handles 39 and 39A which in effect pivot the screed on the pivots 43 and 43A and thereby change the thickness of material being spread by the spreader box as such material of necessity must pass below the screed 13 after it leaves the hopper 10. The screed 13 being adjustably mounted enables the thickness of the material being spread to be accurately controlled as, when the rearmost portion thereof is moved downwardly the material is spread in a thinner layer. When the rearmost end of the screed 13 is elevated the material being spread by the box is formed in a relatively thicker layer. The weight of the hollow frame 11 and the hopper 10 is carried on the wheels 36 and 36A and this enables a truck to pull the device easily.

It will thus be seen that a relatively simple and yet efficient spreader box mechanism has been disclosed whereby asphaltic concrete and similar bituminous materials commonly known as "black top" materials, either hot or cold, and of varying mixes, may be efficiently and rapidly spread, leveled and partially compacted through the employment of the device in combination with a conventional motor truck equipped with mounting means for the device. The attachment of the device to the axle of the truck enables the device, by reason of the freely positioned frame 12 which carries the screed 13, to overcome progressive irregularities in the road bed or other area being paved with the result that the smoothed and partially compacted material is spread uniformly and evenly over the road bed due to the considerable distance between the material engaging portions of the screed and the pivot 12A in the hollow frame 11. In actual operation it has been determined that the spreader box shown and described herein consistently spreads asphaltic and similar bituminous materials a great deal faster and more efficiently and at the same time more evenly than has heretofore been believed possible and when compared in operation to the heretofore common method of spreading such materials by hand labor employing rakes, the device obviously contributes considerably to the economic application of such paving materials. As is common in this art the spread materials are further compacted for use by the rolling thereof by suitable power rollers and the provision of such compacting means is not, therefore, contemplated as a part of this invention.

Having thus described my invention, what I claim is:

1. A spreader box comprising a frame having a hopper positioned on one end thereof and adapted for reception and delivery of material to be spread, means on the other end of said frame for attachment to a truck, wheels midway beneath said frame, a secondary frame pivotally affixed at one end to said frame adjacent the said attachment means, and means on the other end of the said secondary frame, adjacent the said hopper, for engaging the material being spread so as to smooth and partially compact the same, means on said secondary frame for varying the position of the said material engaging means with respect thereto.

2. A spreader box comprising a frame having a hopper positioned on one end thereof and means formed on the other end for attachment to a truck, an axle midway beneath said frame and ground engaging wheels on said axle, a secondary frame pivotally affixed at one end to the said frame at a point near the said truck attachment means, said secondary frame extending beyond the said frame at the other end and provided with a material compacting screed, the said material compacting screed being pivotally affixed to the said secondary frame and having means positioned between the said screed and the said secondary frame for controlling the angle of the said screed with respect to the plane of the said secondary frame.

3. A spreader box for asphaltic materials consisting of a frame having ground engaging wheels mounted thereunder, a material receiving and spreading hopper positioned on one end of said frame, and means for attaching the said frame to a truck formed on the other end thereof, the longitudinal members of the said frame comprising inverted U-shaped channels extending through the said hopper, a pair of arms, one positioned in each of the said channel-like frame members and pivotally affixed thereto at their forward-most ends and adjacent the said truck attachment means, the rearmost end of the said arms extending beyond the end of the said frame and having a material engaging screed adjustably positioned therebeneath for engaging asphaltic material delivered from the said hopper.

4. A spreader box for asphaltic materials consisting of a frame having ground engaging wheels mounted thereinunder, a material receiving and spreading hopper positioned on one end of said frame and means for attaching said frame to a truck formed on the other end thereof, said means including V-shaped guide brackets and hooks positioned therein for longitudinal movement with respect thereto, means on said frame for moving the said hooks in and out of the said V-shaped guide brackets, a pair of arms substantially longer than the said frame, each of which are pivoted at their forward-most ends to the said frame and adjacent the said truck attachment means and having their rearmost ends extending beyond the said hopper, a material engaging screed positioned beneath the said end extensions of the said arms and pivotally affixed thereto, and means between the said arm extensions and the said screed for varying the angle of the said screed with respect to the plane of the said arms.

5. A spreader box for asphaltic materials consisting of a frame having ground engaging wheels mounted thereinunder, a material receiving and spreading hopper positioned on one end of said frame and means for attaching said frame to a truck formed on the other end thereof, said means including V-shaped guide brackets and hooks positioned therein for longitudinal movement with respect thereto, means on said frame for moving the said hooks in and out of the said V-shaped guide brackets, a pair of arms substantially longer than the said frame, each of which are pivoted at their forward-most ends to the said frame and adjacent the said truck attachment means and having their rearmost ends extending beyond the said hopper, a material engaging screed positioned beneath the said end extensions of the said arms and pivotally affixed thereto, and means between the said arm extensions and the said screed for varying the angle of the said screed with respect to the plane of the said arms, said means consisting of vertically positioned screws mounted through threaded openings in the said arms and brackets positioned on the lowermost end of the said screws and pivotally affixed to the said screed.

WILLIAM J. MILLER.